United States Patent
Arai

[11] Patent Number: 5,936,858
[45] Date of Patent: Aug. 10, 1999

[54] ACTUATOR CONTROLLER FOR STATE FEEDBACK CONTROL

[75] Inventor: Toshinobu Arai, Nagoya, Japan

[73] Assignee: Toyota Jidosha Kabushiki Kaisha, Aichi-ken, Japan

[21] Appl. No.: 08/876,379

[22] Filed: Jun. 16, 1997

[30] Foreign Application Priority Data

Jun. 27, 1996 [JP] Japan .................................. 8-167729

[51] Int. Cl.$^6$ .................................................. G05B 13/04
[52] U.S. Cl. ........................ 364/150; 364/149; 364/153; 364/157
[58] Field of Search ..................... 364/153, 149, 364/150, 157, 162, 474.15, 180; 318/610, 560, 561

[56] References Cited

U.S. PATENT DOCUMENTS

| 4,159,444 | 6/1979 | Bartlett et al. | 318/564 |
| 4,437,045 | 3/1984 | Mitsuoka | 318/561 |
| 5,268,625 | 12/1993 | Plummer | 318/610 |

FOREIGN PATENT DOCUMENTS

| A-3-303 | 1/1991 | Japan . |
| A-3-248033 | 11/1991 | Japan . |
| A-4-301738 | 10/1992 | Japan . |
| A-7-55671 | 3/1995 | Japan . |
| A-7-55672 | 3/1995 | Japan . |
| A-7-190910 | 7/1995 | Japan . |

Primary Examiner—Paul P. Gordon
Attorney, Agent, or Firm—Oliff & Berridge, PLC

[57] ABSTRACT

Control characteristics of a control object including a specimen (10), a hydraulic cylinder (12), and a servo valve (16) are expressed in a model, and stored in a model storage section (34). In modeling, dynamical characteristic values (a mass M, a damping coefficient C, a spring constant K) of a specimen (10) are expressed is variables. After substituting the actual characteristic values of a specimen (10) to be tested in the variables of the model, a simulation is run using the model to obtain an optimal feedback gain. When the optimal feedback gain is determined, the pole position of the corresponding system to be controlled is specified. Thereafter, when different specimens (10) having different characteristics are tested, optimal feedback gains for the respective systems are determined by calculating a value which ensures the respective systems the same pole position as the above.

5 Claims, 4 Drawing Sheets

ACTUATOR CONTROLLER FOR STATE FEEDBACK CONTROL

BACKGROUND OF THE INVENTION

1. Field of the Invention

The present invention relates to a controller for an actuator which moves or vibrates an object.

2. Description of the Prior Art

Actuators for operating an object in a predetermined manner are known. For instance, a material testing machine as disclosed in Japanese Patent Laid-open No. Hei 4-301738 is a device for testing the strength of a specimen by giving predetermined vibrations thereto using an actuator. In particular, feedback control is applied in this device to maintain a consistent excitation condition. This means enables vibrating a specimen under a desired condition. Further, data on a gain for feedback control (a feedback gain) is stored for every specimen in a database, so that a feedback gain to be applied for actual excitation is calculated based the data stored. To be specific, when vibration tests are carried out to various specimens having different dynamical characteristics, such as a mass, spring characteristics, attenuation characteristics, an excitation condition for a specimen whose dynamical characteristics are identical or similar to that of the object to be tested is read from the database and referred to in determination of a feed back gain for the test. An optimal feedback gain can be determined more easily in this manner than in a case where a base value for the calculation of an optimal gain is unknown.

The above devise, however, requires a database prepared in advance. Further, data on base values is not yet available at the stage of preparation. Because of this, it takes time and trouble to determine an optimal gain value. Things are more troublesome in the case of a specimen whose characteristic data is not found in a data base. Worse, excitation conditions may be all met while calculations of an optimal value are repeatedly attempted while changing calculation conditions.

SUMMARY OF THE INVENTION

The present invention has been conceived to overcome the above problems and aims to provide an actuator controller which stores data on an object to be controlled (a control object) in the form of a model, and obtains an optimal feedback gain in a simulation using the model.

To achieve the above objects, according to the present invention, there is provided a controller for an actuator, comprising: means for storing a control object model of a control object including an actuator and a specimen to be acted on by the actuator; means for estimating a state parameter for the control object model at the sampling time immediately following that for the state parameter on which the estimate is based; means for multiplying at least one state parameter estimated by the observer by a feedback gain; means for detecting a displacement of the actuator; and means for controlling a displacement of the actuator, based on outputs from the multiplication section and the displacement sensor, wherein the control object model is expressed using variables for items relating to characteristics of the specimen, and the feedback gain is obtained by a calculation using the control object model, where variables are substituted by values of characteristics of an actual specimen.

With this arrangement, an optimal feedback gain can be obtained by a calculation. Thus, it is unnecessary to perform a test for every time specimens are changed to obtain a feed back gain.

The above controller further comprises means for storing a pole position of a control system which introduces an optimal feedback gain, wherein the feedback gain is obtained by a calculation using the control object model, whose variables are substituted by values of characteristics of a specimen to be actually acted on, such that a pole position of the control object model becomes the same as the pole position stored.

In the above controller, the actuator is a hydraulic actuator, and the means for controlling a displacement includes a fluid pressure source, a valve for controlling a connection state between the fluid pressure source and the actuator, and means for controlling the valve to open or close based on outputs from the multiplication section and the displacement sensor.

In another aspect of the invention, there is provided a method for calculating a feedback gain. This method comprises a step of preparing a control object model representing a control object including an actuator and a specimen to be acted on by the actuator, the control object model being expressed using variables for items relating to characteristics of the specimen; a step of preparing an observer, based on the control object model, for presuming a state parameter at the sampling time immediately following that for the state parameter on which the presumption is based; a step of obtaining a pole position of a control system which has been placed in a stable state by using a feedback gain which has been obtained in a state feedback control simulation using the observer and the control object model, whose variables are substituted by constant values; a step of calculating a feedback gain such that a control system of an actual control object model which has been obtained by substituting values of characteristics of a specimen to be actually controlled in the variables of the control object model has the same pole position as the pole position obtained at the step of obtaining a pole position.

In still another aspect of the invention, there is provided a method for controlling an actuator, using a feedback gain obtained using the above method. This method comprises step of defining the observer prepared in the step of preparing an observer, based on the actual control object model; a step of calculating a control correction value by multiplying a state parameter at the sampling time which was presumed by the observer confirmed, immediately following that for the state parameter on which the calculation is based, by the feedback gain; a step of detecting a displacement of the actuator, a step of calculating a control value for the actuator, based on the control correction value and the displacement of the actuator, and a step of controlling the actuator based on the control value.

BRIEF DESCRIPTION OF THE DRAWINGS

The above and the other objects, features, and advantages, will become further apparent from the following description of the preferred embodiment taken in conjunction with the accompanying drawings wherein.

DESCRIPTION OF THE PREFERRED EMBODIMENTS

In the following, a preferred embodiment of an actuator controller of the present invention will be described, referring to the accompanying drawings.

Figure 1:
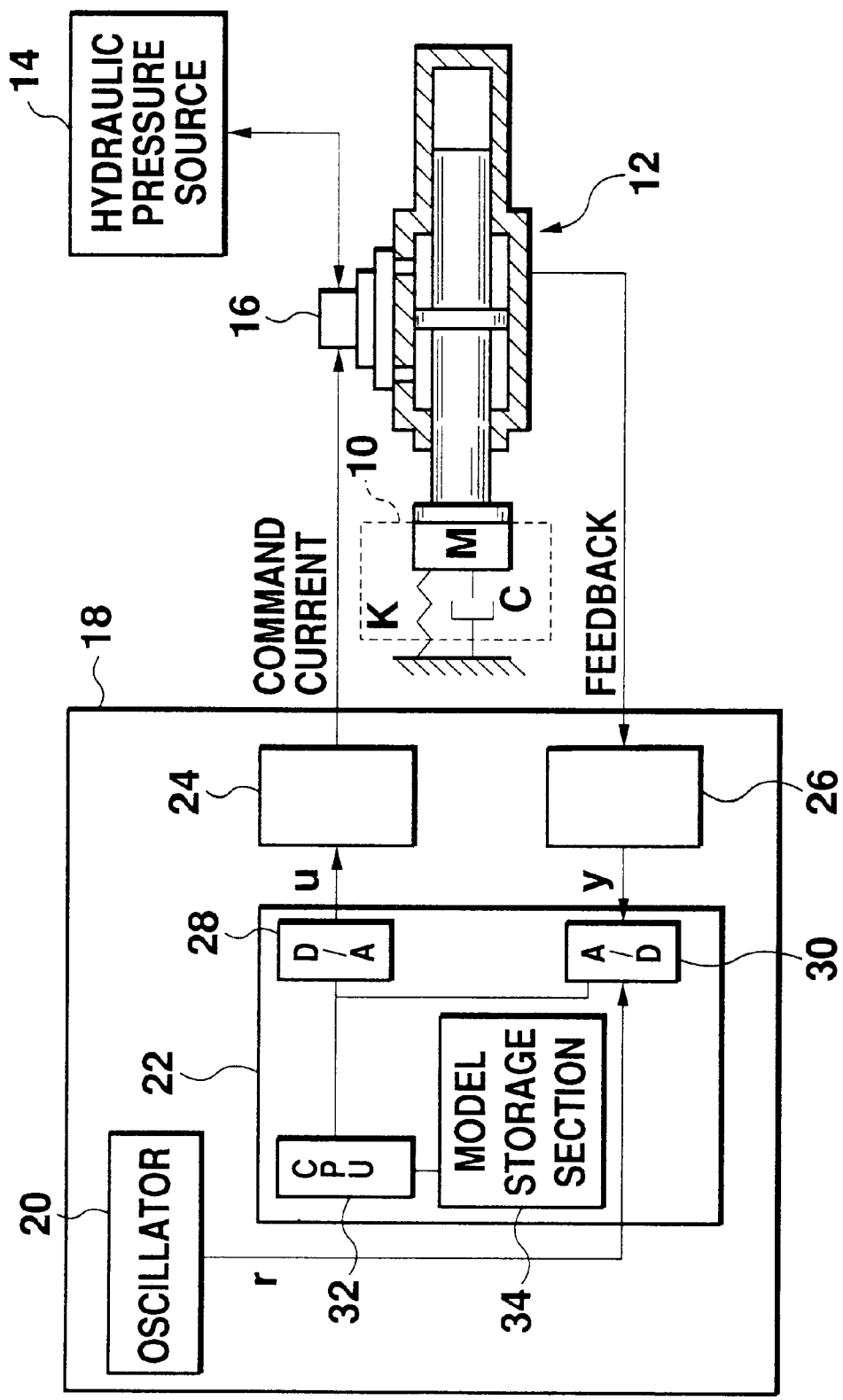
FIG. 1 is a diagram showing major elements of a preferred embodiment of the present invention.

FIG. 1 shows the major elements of an actuator for use in an excitation test. An object to be excited, or a specimen 10, has physical characteristics including a mass M, a spring constant K, and a damping coefficient C. Specimen 10 is excited by a hydraulic cylinder 12, which is supplied with pressure oil from a hydraulic source 14 under appropriate controls by a servo valve 16. Servo valve 16 is controlled by a controller 18.

Controller 18 includes an oscillator 20, which outputs a reference signal r. Based on the reference signal r, an operation section 22 generates a control signal u. Receiving the control signal u, a servo amplifier 24 amplifies the signal, and outputs a command current to a servo valve 16. Also, controller 18 receives data on the actual displacement of hydraulic cylinder 12 as a feedback value. Based on this value, displacement amplifier 26 generates a feedback signal y and supplies it to operation section 22. Receiving the feedback signal y, operation section 22 generates the control signal u based on the difference between the feedback signal and the reference signal r. A D/A converter 28 and an A/D converter 30 for digital operations are provided at respective input and output parts of operation section 22, to be adjusted to outside analog signals. Operation section 22 also includes a central processing unit (CPU) 16 and a model memory 34. Model memory 34 stores information on the characteristics of a specimen 10, a hydraulic cylinder 12, and a servo valve 16. The characteristics of the specimen are expressed as variables. When substituting the actual values of a specimen to be tested in the variables, an object to be controlled by controller 18 (a control object) is resultantly expressed in a model.

Figure 2:
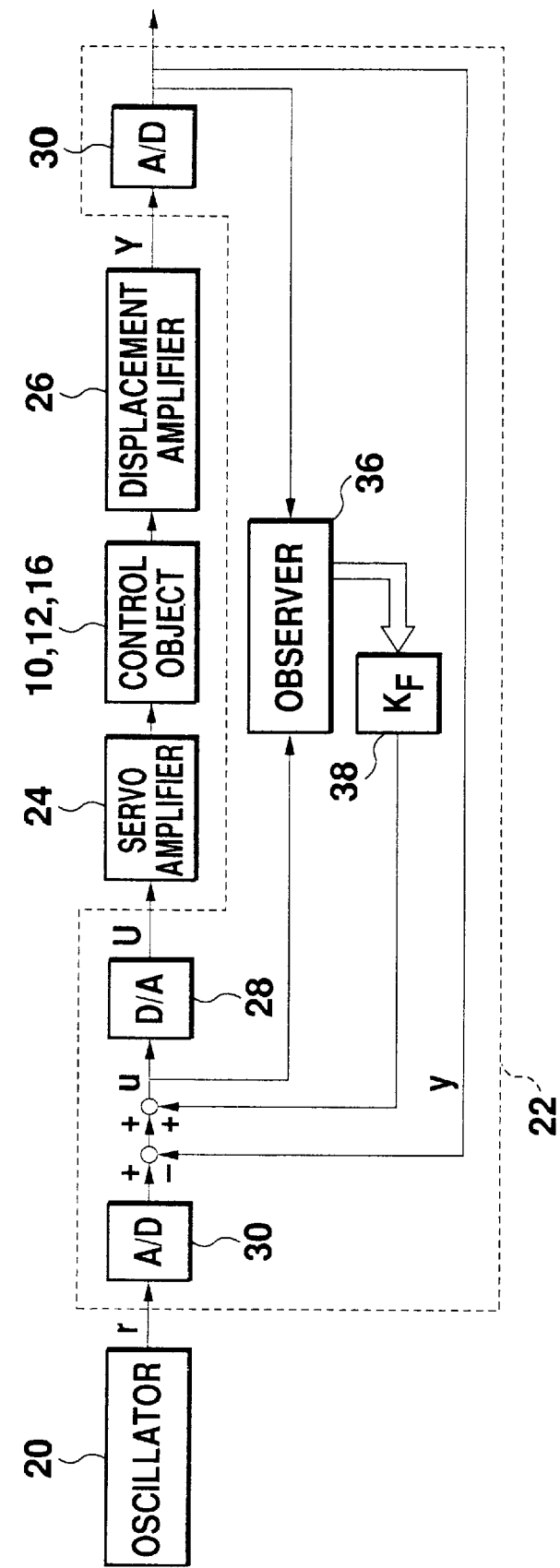
FIG. 2 is a block diagram showing the structure of the preferred embodiment.

FIG. 2 is a block diagram of a control system in the preferred embodiment. After being outputted by oscillator 20, a reference signal r is converted into a digital signal by A/D converter 30. Then, the difference between the reference signal r and the feedback signal y is calculated. A state observer 36 calculates a state parameter, which is multiplied by a feedback gain $K_F$ by amplifier 38 and then added to the difference calculated above. Data on the added value is converted into analog data by a D/A converter 28, and amplified by a servo amplifier 24 before being outputted. Receiving the data, control objects 10, 12, 16 in turn output data on a feedback value into a displacement amplifier 26. This value data is first amplified by a displacement amplifier 26, and then converted by an A/D converter 30 into digital data, whereby a feedback signal y is generated.

In the above process, state observer 36 presumes a state parameter at the next sampling time, based on the present state parameter, using a state equation. A state equation is a model of a control object, expressed using variables for the items indicating some physical parameters of the object. When multiplying this presumed value by a predetermined feedback gain, a feedback operation is achieved. Therefore, in the above process, a state feedback control is performed in a control section of this embodiment. It should be noted that an optimal value for a feedback gain $K_F$ differs for every specimen. In this embodiment, it is calculated in advance. In the following, the calculation of an optimal feedback gain $K_F$ will be described.

First, control characteristics of a control object (i.e., a specimen 10, a hydraulic cylinder 12, and a servo valve 16) are expressed in an equation model. For this, those of a specimen 10 and a hydraulic cylinder 12 will be initially obtained.

A servo valve flow rate Q, which is a function of a servo valve input current I and a load pressure P, is expressed as $$Q = \frac{\partial Q}{\partial I} \cdot I - \frac{\partial Q}{\partial P} P = K_{sv} I - K_p \cdot P. \tag{1}$$

As this can also be considered the sum of a flow rate Qm necessary to move a piston of a hydraulic cylinder 12, a cylinder leaking flow rate Qn, and a change of an oil volume Qc when compressed, the value can also be expressed as $$Q = Qm + Qn + Qc \tag{2}$$

Flow rates Qm, Qn, and a volume change Qc in the equation 2 are respectively expressed as $$Q_m = A \cdot \frac{dY}{dt} \tag{3}$$

$$Q_n = L \cdot P \tag{4}$$

$$Q_c = \frac{V}{B} \cdot \frac{dP}{dt}, \tag{5}$$

wherein A is a pressure area of a piston; Y is a piston displacement; L is an oil leaking coefficient; V is a volume of oil to be compressed; and B is a volume elastic coefficient of oil. According to equations 1 to 5, $$K_{SV} \cdot I - K_p \cdot P = A \cdot \frac{dY}{dt} + L \cdot P + \frac{V}{B} \cdot \frac{dP}{dt} \tag{6}$$

is obtained. In view of the balance of pressure given to a piston, $$F = P \cdot A = M \frac{d^2 Y}{dt^2} + C \frac{dY}{dt} + KY \tag{7}$$

is obtained. Laplace transformation of equations 6 and 7 introduces, $$Y(s) = \frac{\omega_{cy}^2}{s^3 + 2\zeta_{cy}\omega_{cy}s^2 + \omega_{cy}^2 s + K_{sp}} \cdot Q(s). \tag{8}$$

Next, since servo valve 16 is generally a part of a second order lag system, its control characteristic is expressed as $$Q(s) = \frac{\omega_{sv}}{s^2 + 2\zeta_{sv}\omega_{sv}s + \omega_{sv}^2} \cdot I(s). \tag{9}$$

Further, the characteristics of servo amplifier 24 is expressed as $$I(s) = K_a \cdot U(s) \tag{10}$$

According to equations 8, 9, 10, control characteristics of a control object and servo amplifier 24 of this embodiment are expressed as $$Y(s) = K_a \cdot \frac{\omega_{sv}^2}{s^2 + 2\zeta_{sv}\omega_{sv}s + \omega_{sv}^2} \cdot \frac{\omega_{cy}^2}{s^3 + 2\zeta_{cy}\omega_{cy}s^2 + \omega_{cy}^2 s + K_{sp}} \cdot U(s) \tag{11}$$

wherein $$\begin{cases} \omega_{cy} = \sqrt{\dfrac{2A^2 B}{MV}} \\ \zeta_{cy} = \dfrac{(L+K)M\omega_{cy}}{2A^2} + \dfrac{CV\omega_{cy}}{4A^2 B} \\ K_{sp} = \dfrac{BK}{MV}(L+K). \end{cases}$$

In equation 11, a mass M, an attenuation coefficient C, and a spring constant K of a specimen are expressed as variables. This vibration model, including variables for dynamic constants of a specimen (mass, damping coefficient, spring constant), is stored in model storage 34. When substituting the values of an actual specimen for these variables, a model of a control object concerned is obtained.

Based on the above vibration model, a state equation and an output equation in a discrete-time system can be obtained as $$\left. \begin{array}{l} x_v(k+1) = P \cdot x_v(k) + Q \cdot u(k) \\ y(k) = C \cdot x_v(k) \end{array} \right\}, \qquad (12)$$

wherein $x_v(k)$ is a vector which indicates some physical parameters of an object system to be controlled, and referred to as a state variable; u(k) is an input into the system, corresponding to a voltage applied to a servo amplifier in this embodiment; and y(k) is an output from the system, corresponding to a displacement of a piston of a hydraulic cylinder. P, Q, C in equation 12 are coefficient matrix, and can be easily calculated using a conventional method when the system concerned is defined as above. Using equation 12, a state parameter at the next sampling time (k+1) can be estimated, based on a state parameter at a sampling time k. With a state parameter at time (k+1) estimated, an applied voltage to a servo amplifier at time (k+1) is calculated, and then multiplied by a feedback gain $K_F$ to achieve a feedback operation.

An optimal feedback gain $K_F$ can be obtained in a simulation using a model of the control object. To be specific, a simulation is run using a desired value as a feedback gain $K_F$, and an optimal value is determined based on the simulation result. When an optimal feedback gain $K_F$ is determined, the pole position of the corresponding system can be calculated. Thereafter, when a different specimen having different characteristic values is to be tested, an optimal feedback gain $K_F$ for that system can be obtained by calculating a value which ensures the same pole position as that which has already been obtained above.

Figure 3:
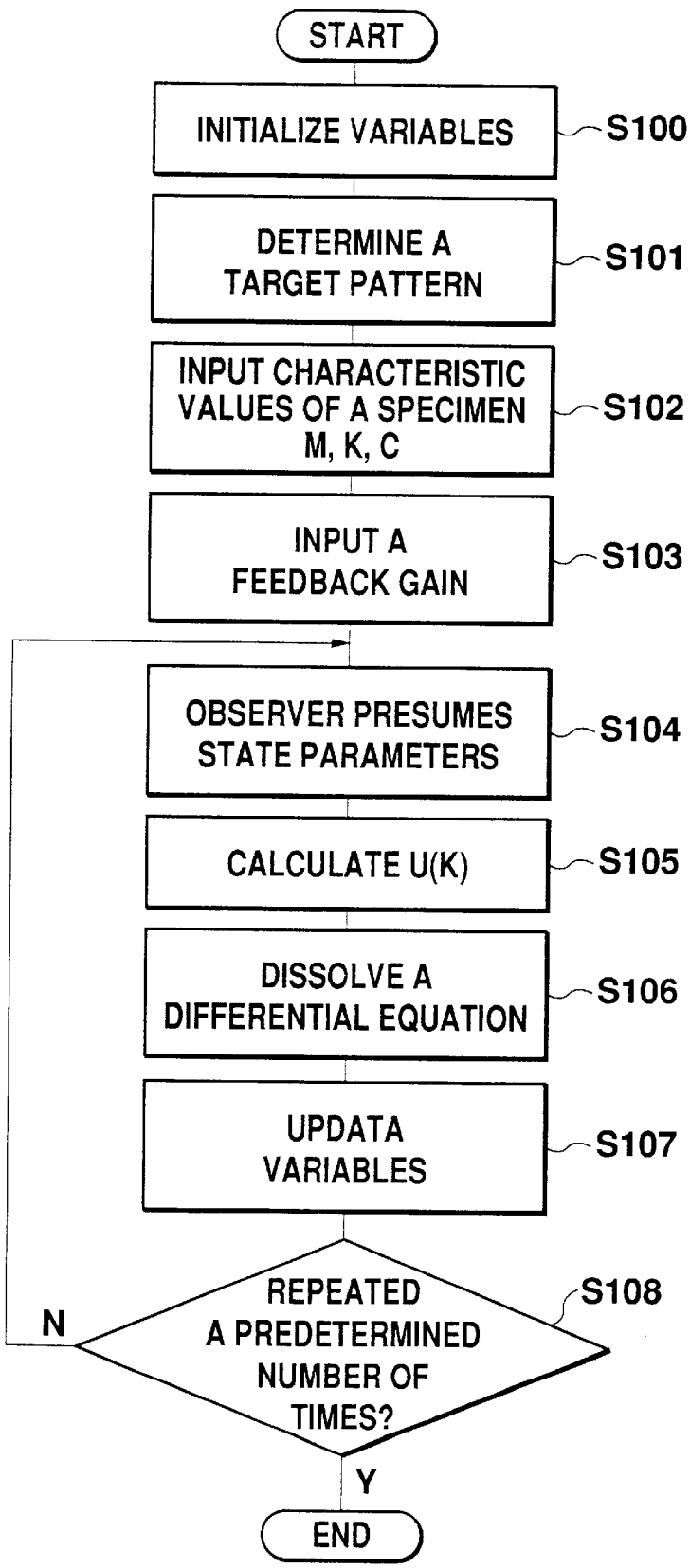
FIG. 3 is a flowchart of a calculation for an optimal feedback again.

FIG. 3 is a flowchart of a calculation for obtaining an optimal feedback gain $K_F$. First, respective variables are initialized (S100), and an objective pattern is determined (S101). An objective pattern may be such a pattern that a specimen vibrates in a sinusoidal motion. The dynamic characteristics of a specimen, i.e., a mass M, an attenuation coefficient C, a spring constant K, are then inputted (S102), and a desired value is selected as a feedback gain (S103). With the above, a system to be controlled has been expressed in a model, so that a simulation can be started using the model. In a simulation, an observer presumes a state variable (S104), and an applied voltage to a servo amplifier is then calculated (S105). A differential equation of the system expressed in a model is dissolved to detect the state of the system in a predetermined period of time (S106). The solutions obtained at S106 are substituted in respective variables in the model (S107). Using the model including the solutions substituted therein as an initial condition, the process from S104 to S107 is repeated at predetermined times to complete the calculation (S108).

Following the above calculation process, the vibration state of a specimen is analyzed, and it then becomes possible to judge whether the vibration actually presents an objective pattern determined earlier. If it does not because of diversion or other reasons, the calculation process returns to S103, where a different value is selected as a feedback gain $K_F$ (S103) and a simulation is run again. This will be repeated until an optimal feedback gain $K_F$ is found.

Figure 4:
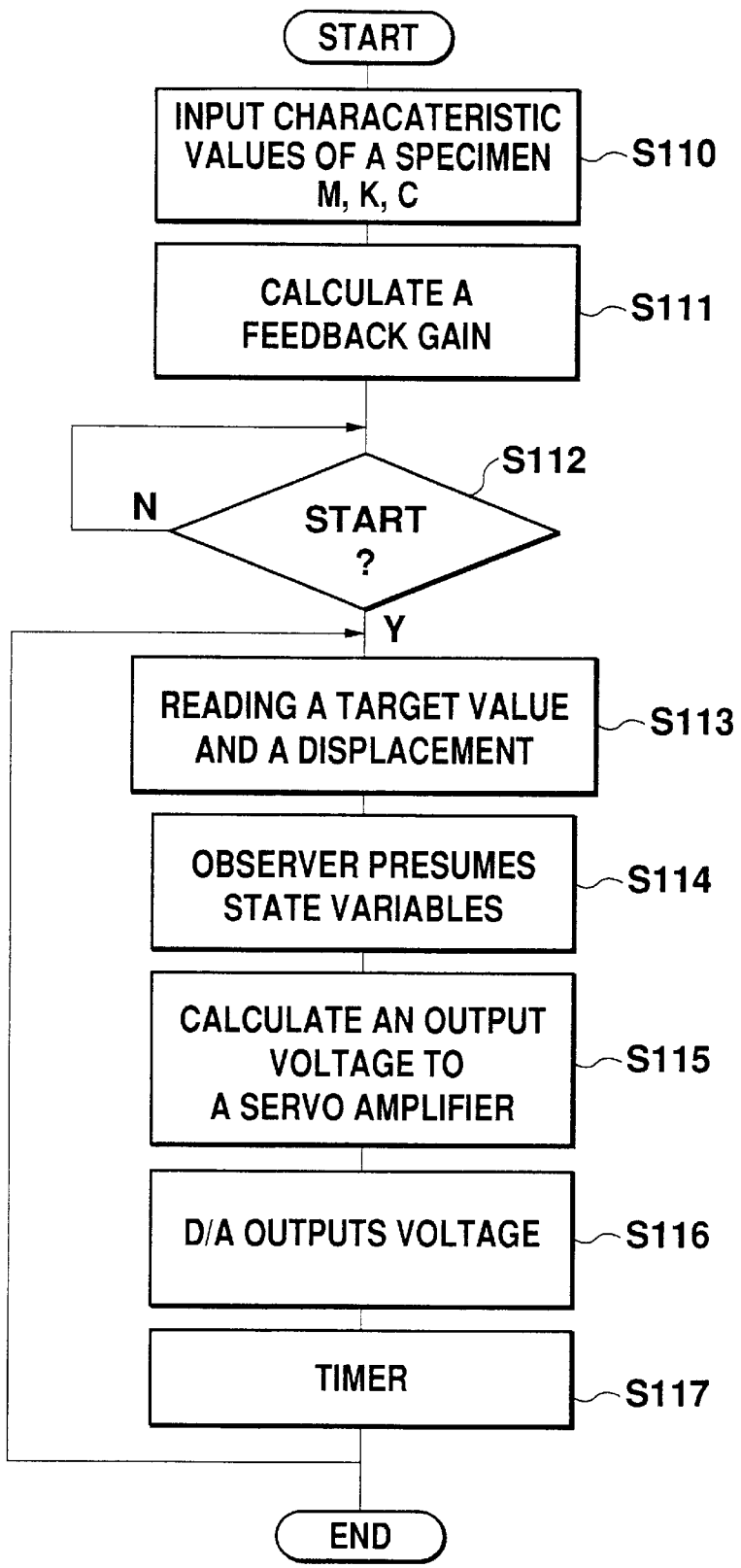
FIG. 4 is a flowchart of a control operation applied in an experiment.

FIG. 4 is a flowchart of a process carried out by a controller. Characteristic values of a specimen to be tested are first inputted (S110). Then, a feedback gain $K_F$ is obtained such that the pole of the system including the specimen is located at the same position as that which has already been determined using an optimal feedback gain $K_F$ (S111). Upon issuance of a starter actuate command (S112), a control operation is started. In controls, a target value for the control and a piston displacement necessary to achieve the target are initially read from an output from A/D converter 30 (S113), and observer 36 then presumes a state variable (S114). Based on the presumed state variable and the actual piston displacement, an output voltage to the servo amplifier is calculated (S115) so that D/A converter outputs data on this output voltage (S116). This process from S113 to S116 is repeated for every predetermined number of control cycles (S117).

As described above, a system to be controlled is expressed in a model in this embodiment. This enables obtaining an optimal feedback gain $K_F$ in a simulation. Further, even when a different specimen is tested, an optimal feedback gain $K_F$ for the system including the specimen can be determined by calculating a feedback gain which ensures the same pole position as that of the system for which an optimal feedback gain $K_F$ has already been determined. In other words, once an optimal value of a feedback gain $K_F$ is obtained in a simulation and the corresponding pole position is determined, an optimal feedback gain to be used in a subsequent control operation with respect to a different specimen can be determined by calculating a value which ensures the new system the same pole position as that determined above. That is, a feedback gain can be obtained by a calculation, and actual performance of actuator control is thus unnecessary in order to know an optimal feedback gain $K_F$. Therefore, an excitation test can be started instantly using the feedback gain calculated. A trial before the actual test is not required.

What is claimed is:

1. A controller for an actuator, comprising:
   a control object model storage section for storing a control object model of a control object including an actuator and a specimen to be acted on by the actuator;
   an observer for estimating a state parameter for the control object model at the sampling time immediately following that for the state parameter on which the estimate is based;
   a multiplication section for multiplying at least one state parameter estimated by the observer by a feedback gain;
   a displacement sensor for detecting a displacement of the actuator; and
   a displacement control section for controlling a displacement of the actuator, based on outputs from the multiplication section and the displacement sensor, wherein
- the control object model is expressed using variables for items relating to characteristics of the specimen, and
- the feedback gain is obtained by a calculation using the control object model, where variables are substituted by values of characteristics of an actual specimen.

2. A controller as defined in claim 1, further comprising
a pole position storage section for storing a pole position of a control system which introduces an optimal feedback gain,
wherein
- the feedback gain is obtained by a calculation using the control object model, whose variables are substituted by values of characteristics of a specimen to be actually acted on, such that a pole position of the control object model becomes the same as the pole position stored.

3. A controller as defined in claim 1, wherein
the actuator is a hydraulic actuator; and
the displacement control section includes a fluid pressure source, a valve for controlling a connection state between the fluid pressure source and the actuator, and a valve open/close controller for controlling the valve to open or close based on outputs from the multiplication section and the displacement sensor.

4. A method for controlling an actuator, comprising:
a step of preparing a control object model representing a control object including an actuator and a specimen to be acted on by the actuator, the control object model being expressed using variables for items relating to characteristics of the specimen;
a step of preparing an observer, based on the control object model, for presuming a state parameter at the sampling time immediately following that for the state parameter on which the presumption is based;
a step of obtaining a pole position of a control system which has been placed in a stable state by using a feedback gain which has been obtained in a state feedback control simulation using the observer and the control object model, whose variables are substituted by constant values;
a step of calculating a feedback gain such that a control system of an actual control object model which has been obtained by substituting values of characteristics of a specimen to be actually controlled in the variables of the control object model has the same pole position as the pole position obtained at the step of obtaining a pole position;
a step of defining the observer prepared in the step of preparing an observer, based on the actual control object model;
a step of calculating a control correction value by multiplying a state parameter at the sampling time which was presumed by the observer confirmed, immediately following that for the state parameter on which the calculation is based by the feedback gain;
a step of detecting a displacement of the actuator;
a step of calculating a control value for the actuator, based on the control correction value and the displacement of the actuator; and
a step of controlling the actuator based on the control value.

5. A method for calculating a feedback gain, comprising:
a step of preparing a control object model representing a control object including an actuator and a specimen to be acted on by the actuator, the control object model being expressed using variables for items relating to characteristics of the specimen;
a step of preparing an observer, based on the control object model, for presuming a state parameter at the sampling time immediately following that for the state parameter on which the presumption is based;
a step of obtaining a pole position of a control system which has been placed in a stable state by using a feedback gain which has been obtained in a state feedback control simulation using the observer and the control object model, whose variables are substituted by constant values; and
a step of calculating a feedback gain such that a control system of an actual control object model which has been obtained by substituting values of characteristics of a specimen to be actually controlled in the variables of the control object model has the same pole position as the pole position obtained at the step of obtaining a pole position.

* * * * *